United States Patent
Kang

(10) Patent No.: US 7,464,864 B2
(45) Date of Patent: Dec. 16, 2008

(54) METHODS FOR CONTROLLING ACCESS TO DATA STORED IN SMART CARDS AND RELATED DEVICES

(75) Inventor: Byung-Yoon Kang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/363,972

(22) Filed: Feb. 28, 2006

(65) Prior Publication Data

US 2007/0023503 A1    Feb. 1, 2007

(30) Foreign Application Priority Data

Jul. 28, 2005    (KR) .................. 10-2005-0068951

(51) Int. Cl.
*G06K 5/00* (2006.01)
(52) U.S. Cl. ..................... 235/380; 235/492
(58) Field of Classification Search ............... 235/380, 235/382, 492, 474, 375; 710/14, 313, 2, 710/11, 5; 713/182, 185
See application file for complete search history.

(56) References Cited

U.S. PATENT DOCUMENTS

| | | | |
|---|---|---|---|
| 6,268,788 B1 * | 7/2001 | Gray | 340/5.2 |
| 6,439,464 B1 * | 8/2002 | Fruhauf et al. | 235/492 |
| 6,557,754 B2 * | 5/2003 | Gray et al. | 235/375 |
| 6,801,956 B2 * | 10/2004 | Feuser et al. | 710/14 |
| 6,945,454 B2 * | 9/2005 | Tournemille et al. | 235/375 |
| 7,150,397 B2 * | 12/2006 | Morrow et al. | 235/451 |
| 2005/0097237 A1 * | 5/2005 | Ruping et al. | 710/15 |

FOREIGN PATENT DOCUMENTS

| | | |
|---|---|---|
| JP | 2005-044191 | 2/2005 |
| KR | 1020010106870 A | 12/2001 |
| KR | 1020020031604 A | 5/2002 |
| KR | 1020030018203 A | 3/2003 |

OTHER PUBLICATIONS

Notice to Submit Response corresponding to Korean Patent Application No. 10-2005-0068951 mailed Aug. 28, 2006.

* cited by examiner

*Primary Examiner*—Daniel St. Cyr
(74) *Attorney, Agent, or Firm*—Myers Bigel Sibley & Sajovec, PA

(57) ABSTRACT

In a method for controlling access to data stored on a smart card, an external request for communication with the smart card is received via a first communication interface. The external request for communication may be a request for communication over a second communication interface, for example, from a smart card reader. Private data from the smart card is transmitted via the second communication interface responsive to authentication of a user of the smart card. Related devices are also discussed.

20 Claims, 5 Drawing Sheets

METHODS FOR CONTROLLING ACCESS TO DATA STORED IN SMART CARDS AND RELATED DEVICES

CROSS-REFERENCE TO RELATED APPLICATIONS

This application claims priority from Korean Patent Application No. 10-2005-0068951, filed on Jul. 28, 2005, in the Korean Intellectual Property Office, the disclosure of which is hereby incorporated by reference herein in its entirety.

FIELD OF THE INVENTION

The present invention relates to communications, and more particularly, to communications with smart card data storage devices.

BACKGROUND OF THE INVENTION

A smart card is a plastic card into which an integrated circuit (IC) may be installed, and may be similar to a credit card. When used as a subscriber identification module (SIM) card, the smart card may be manufactured to be small enough to be included into a mobile phone.

Standards for smart card technology have been defined by the International Standards Organization (ISO) and the Joint Technical Committee 1 (JTC1) of the International Electronic Committee (IEC). The International standard series ISO/IEC 7816 defines various characteristics of smart cards, such as physical properties, physical connections, electronic signals, transmission protocols, commands, security architectures, application identifiers, and general data elements.

In the field of mobile communications, the smart card has been used as both an ID card for identifying a subscriber and as a card for processing billing information (such as an electronic bill) throughout most of European countries. Smart cards for communications may be classified according to the types of networks used. For example, in the Global System for Mobile communications (GSM) environment, a SIM card that has a subscriber authentication function and a roaming function may be used. Accordingly, a communications service provider may issue a SIM card to a subscriber, and a subscriber who holds the SIM card can freely use communications services via a mobile terminal that is configured to accept the SIM card.

SIM cards have been developed as a platform for data services, for example, by European providers who have provided GSM-based mobile communications services. In particular, mobile communications providers have determined that mobile electronic commerce may be a significant part of wireless Internet strategies to provide various services. To provide such data services, a universal serial bus (USB) interface may be installed into the SIM card. The USB interface may enable transmission of a relatively large amount of data at a relatively high speed.

However, since the smart card may store information, such as a residential registration number, a credit card number, and/or billing information, a security function may be additionally included into the smart card to limit access to such information.

SUMMARY OF THE INVENTION

Some embodiments of the present invention provide methods of establishing communication security by transmitting data stored in a smart card via a universal serial bus (USB) interface when user authentication is made when the data is accessed, and a communication apparatus for the same.

According to some embodiments of the present invention, a method of establishing communication security, may include a first device, which communicates via a first interface, requesting a second device to establish communications via a second interface; the first device receiving user information when the second device responds to the request for communications via the second interface; and the first device authenticating the received user information and communicating with the second device via the second interface.

According to other embodiments of the present invention, a communication apparatus may include a first interface unit; a second interface unit; a connection unit, one end of which is connected to both the first and second interface units, and the other end of which is connected to the outside of the communication apparatus; and a controller receiving user information and authenticating the received user information when communications are to be established via the second interface unit during communications via the first interface unit.

According to further embodiments of the present invention, a method for controlling access to data stored on a smart card configured to communicate with a smart card reader via a first communication interface may include transmitting private data from the smart card to the reader via a second communication interface responsive to authenticating a user of the smart card.

According to some embodiments of the present invention, a method for controlling access to data stored on a smart card may include receiving, via a first communication interface, an external request for communication with the smart card, and transmitting, via a second communication interface, private data from the smart card responsive to authentication of a user thereof. For example, the external request for communication may be a request for communication over the second communication interface. More particularly, the external request for communication may be a request for the private data.

In some embodiments, transmission of the private data from the smart card may be prevented responsive to failed authentication of the user.

In other embodiments, data may be received from an external device via the first and/or second communication interface responsive to authentication of the user. For example, the external device may be a smart card reader.

In some embodiments, user information may be received from the user prior to transmitting the private data. The received user information may be compared with authentication information stored in the smart card to authenticate the user.

In other embodiments, the private data may be a name, an address, a social security number, a credit card number, and/or billing information. Also, the second communication interface may a higher-speed interface than the first communication interface. For example, the first communication interface may be an International Standards Organization (ISO) interface, and the second communication interface may be a Universal Serial Bus (USB) interface.

According to other embodiments of the present invention, a smart card data storage device may include a storage unit, a connection unit, and a controller. The storage unit may be configured to store private data. The connection unit may be configured to provide first and second communication interfaces, and the controller may be configured to receive an external request for communication with the smart card via the first communication interface. The controller may also be configured to transmit private data from the smart card via the second communication interface responsive to authentication of a user thereof.

In some embodiments, the controller may be further configured to prevent transmission of the private data from the smart card responsive to failed authentication of the user.

In other embodiments, the controller may be configured to receive data from an external device via the first and/or second communication interface responsive to authentication of the user. For example, the external device may be a smart card reader configured to read information stored in the smart card.

In some embodiments, the controller may be configured to receive user information from the user, and may be configured to compare the received user information with authentication information stored in the storage unit to authenticate the user.

According to still other embodiments of the present invention, a communication device may include a controller, a first communication interface coupled to the controller, and a second communication interface coupled to the controller. The controller may be configured to transmit a request for data to a smart card via the first communication interface. The controller may be further configured to receive private data from the smart card via the second communication interface responsive to authentication of a user thereof.

In some embodiments, the device may further include a user interface coupled to the controller. The user interface may be configured to receive user information from the user, and the controller may be configured to authenticate the user based on the received user information. More particularly, the controller may be configured to receive authentication information from the smart card via the first communication interface, and may be configured to compare the received user information with the authentication information to authenticate the user.

In other embodiments, the controller may be configured to transmit data to the smart card via the first and/or second communication interface responsive to authentication of the user.

DETAILED DESCRIPTION OF EMBODIMENTS OF THE INVENTION

Figure 1:
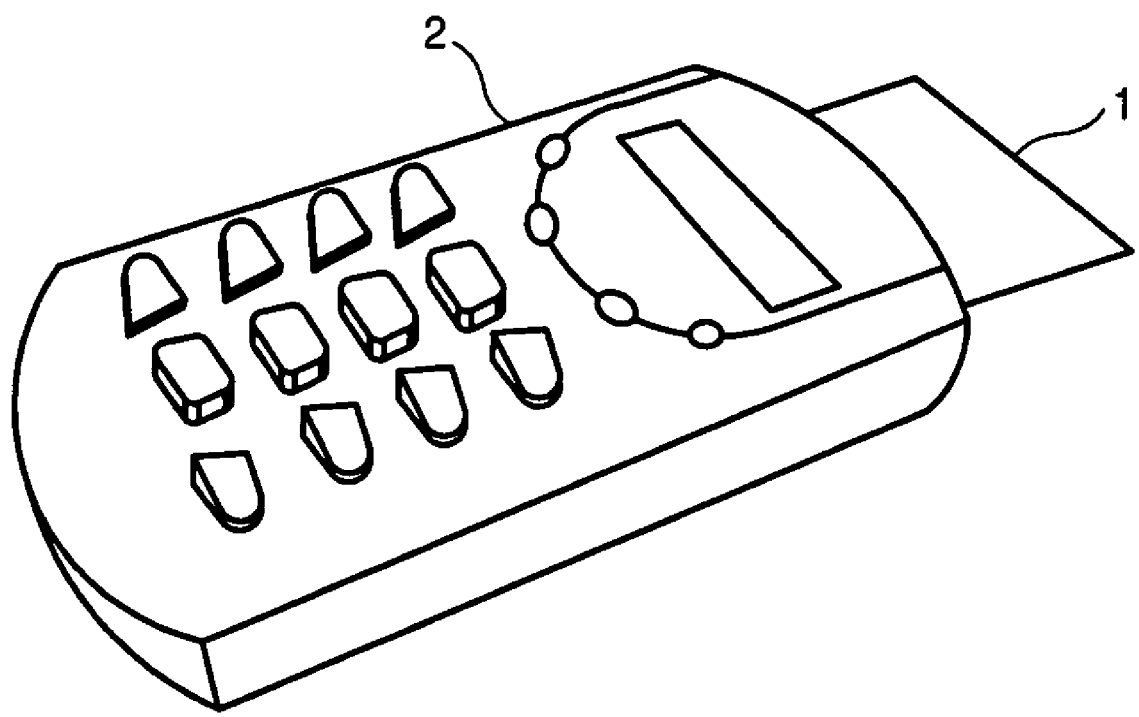
FIG. 1 illustrates insertion of a smart card into a smart card reading apparatus.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates the insertion of a smart card 1 into a smart card reading apparatus 2. The smart card reading apparatus 2 contacts the smart card 1 upon insertion and is configured to read information from the smart card 1, for example, to identify a user and/or charge the user for use of the smart card 1.

Figure 2:
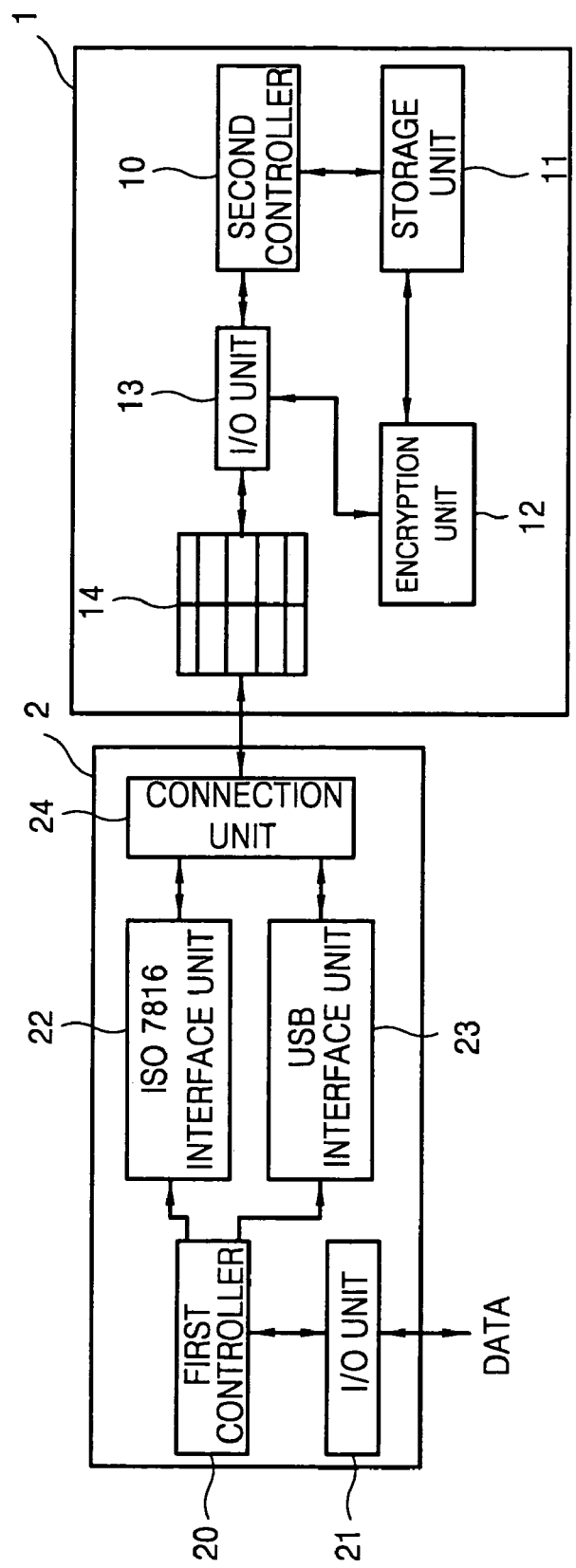
FIG. 2 is a block diagram illustrating the smart card reading apparatus and the smart card shown in FIG. 1.

FIG. 2 is a block diagram illustrating the smart card reading apparatus 2 and the smart card 1 shown in FIG. 1. The smart card reading apparatus 2 includes a first controller 20, an input-output (I/O) unit 21, an International Standards Organization (ISO) 7816 interface 22, a universal serial bus (USB) interface 23, and a connection unit 24.

The first controller 20 generally communicates with the smart card 1 via the ISO 7816 interface 22, but may also communicate with the smart card 1 via the USB interface 23. The I/O unit 21 receives data from the user via an input unit (not shown) such as a keypad or a touch screen, displays the data via an output unit (not shown) such as a liquid crystal display (LCD), or outputs the data as sound via an output unit (not shown) such as a speaker.

Referring to FIG. 2, the smart card 1 includes a second controller 10, a storage unit 11, an encryption unit 12, an I/O unit 13, and a connection unit 14. The second controller 10 analyzes and processes commands received via the connection unit 14 and the I/O unit 13. The encryption unit 12 encrypts data which may require security, such as user information or billing information, stores the encrypted data in the storage unit 11, and decrypts the encrypted security data stored in the storage 11. In this case, a conventional encryption method, such as the data encryption standard (DES), and/or the Rivest, Shamir, and Adleman (RSA) encryption standard, may be used.

Figure 3:
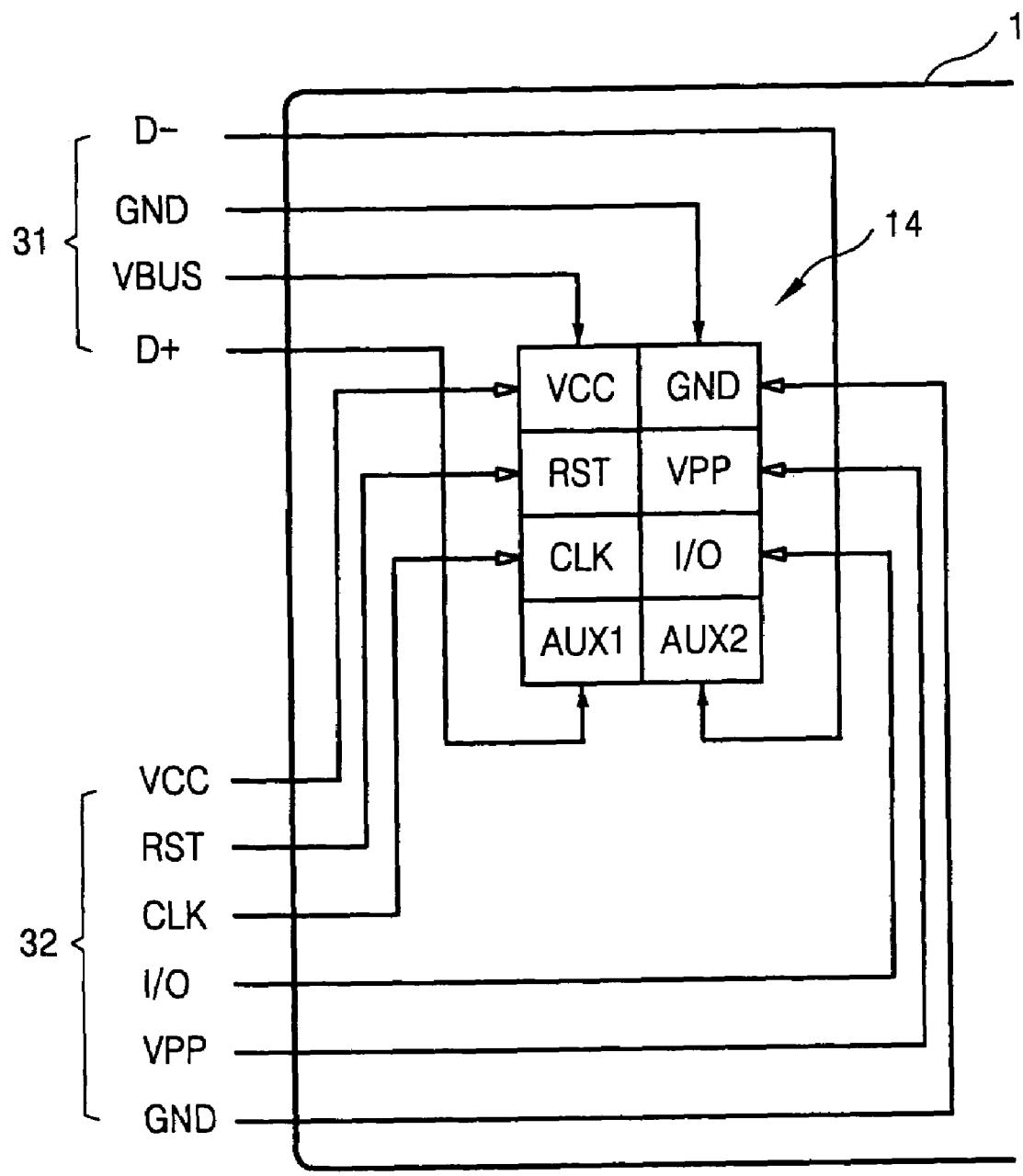
FIG. 3 illustrates terminals of a connection unit of FIG. 2.

The connection unit 14 includes a plurality of terminals configured to be connected to the connection unit 24 of the smart card reading apparatus 2. FIG. 3 further illustrates the connection unit 14 of FIG. 2. In FIG. 3, reference designator 31 denotes terminals to be used in the USB interface, and reference designator 32 denotes terminals to be used in the ISO 7816 interface.

Referring now to FIG. 3, a supply voltage is applied via a VCC terminal, a reset signal is supplied via an RST terminal, a clock signal is supplied via a CLK terminal, a ground voltage is applied via a GND terminal, a programming voltage is applied via a VPP terminal, and data is input to or output via an I/O terminal. Also, an AUX1 terminal and an AUX2 terminal are reserved terminals when they are used for the ISO 7816 interface, but may respectively be used as a D+ signal terminal and a D− signal terminal when they are used for the USB interface.

When the connection unit 14 is connected to the ISO 7816 interface 22 via the connection unit 24, the VPP terminal is not used, and electronic signals defined in the ISO 7816-3 standard are applied to the RST terminal, the CLK terminal, and the I/O terminal. When the connection unit 14 is connected to the USB interface 23 via the connection unit 24, electronic D+ and D− signals defined in the USB standard are applied to the AUX1 terminal and the AUX2 terminal.

Figure 4:
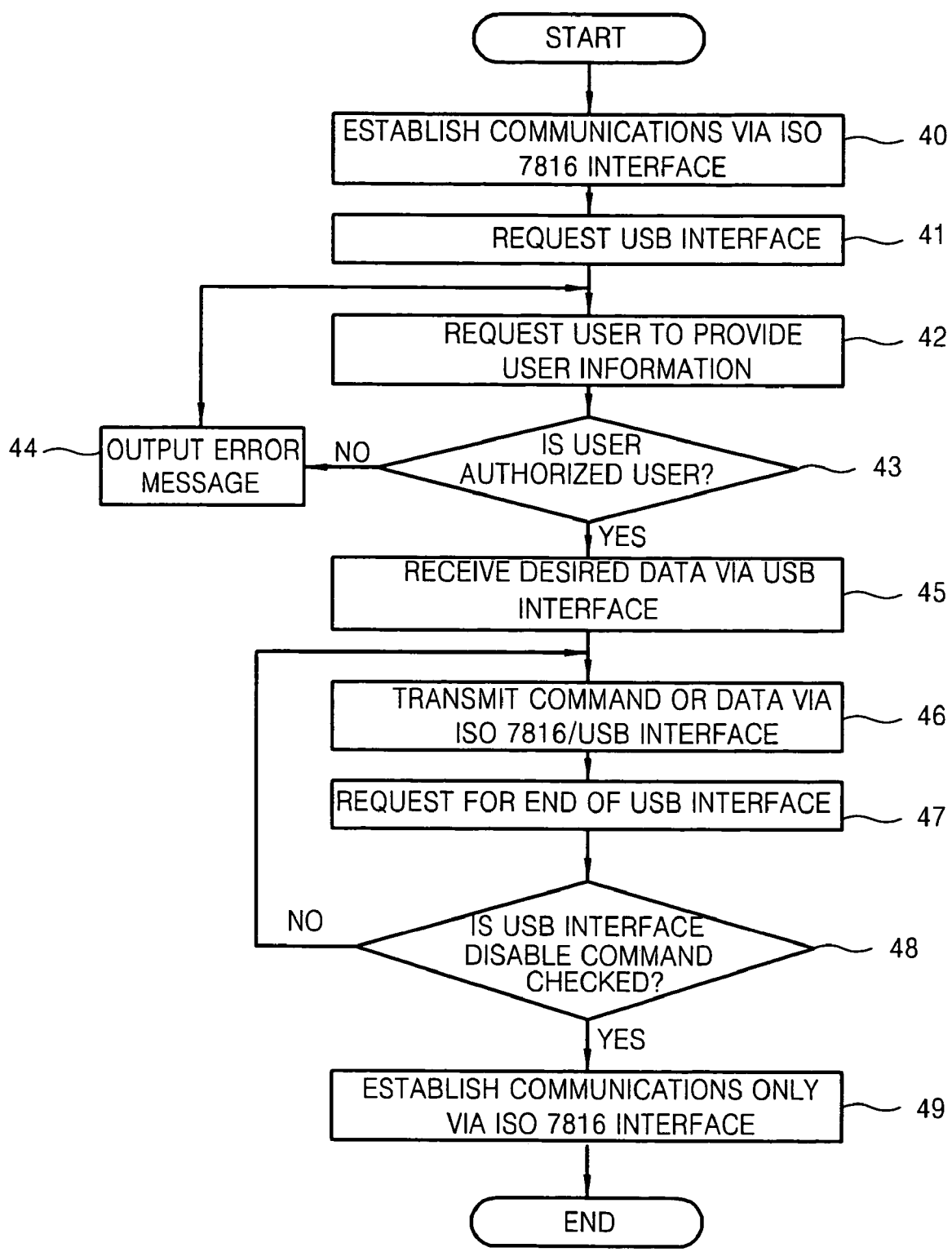
FIG. 4 is a flowchart illustrating a method of establishing communication security for transmission of data stored in a smart card according to some embodiments of the present invention.

FIG. 4 is a flowchart illustrating a method of establishing security for transmission of data stored in a smart card according to some embodiments of the present invention. Referring now to FIGS. 2 and 4, while communicating with the smart card 1 via the ISO 7816 interface 22 (block 40), the first controller 20 makes a request for communications with the second controller 10 via the USB interface 23 by transmitting a USB interface enable command to the second controller 10 so as to receive specific data from the smart card 1 (block 41). The second controller 10 analyzes and checks the received USB interface enable command, and responds to the request from the first controller 20.

The first controller 20 requests a user to provide user information for identifying the user (operation 42). Upon receiving the user information from the user, the first controller 20 requests the second controller 10 to provide user information, and the second controller 10 provides the first controller 20 with the user information that is stored in the storage unit 11 and decrypted by the encryption unit 12. The first controller 20 compares the user information received from the user with the user information from the second controller 10, and determines whether the user is an authorized user (block 43).

If it is determined that the user is not an authorized user, the first controller 20 outputs an error message (block 44). If it is determined that the user is an authorized user, the first controller 20 requests the second controller 10 to provide desired data and receives it from the second controller 10 via the USB interface 23 (block 45). Data transmission may be performed in a bulk transfer mode or a control transfer mode.

Figure 5:
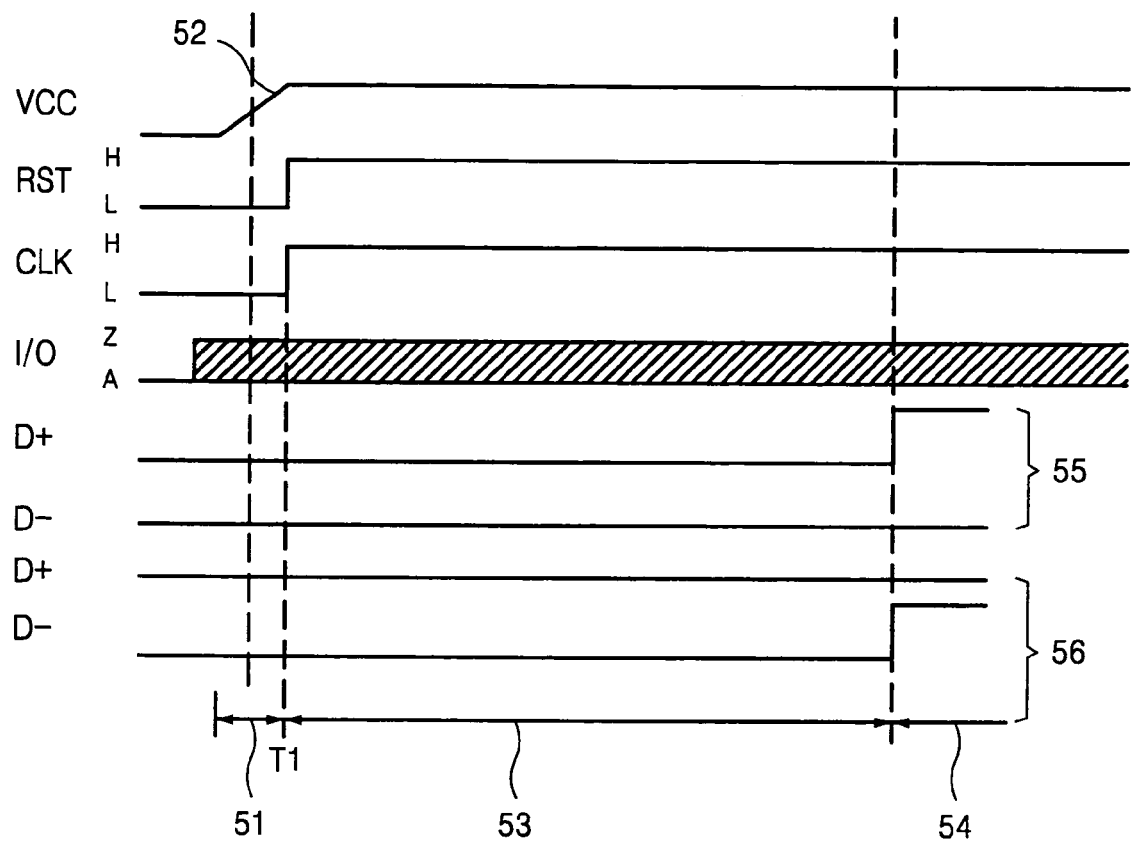
FIG. 5 illustrates signals output from a universal serial bus (USB) interface to a connection unit of a smart card according to some embodiments of the present invention.

FIG. 5 illustrates signals output from the USB interface 23 to the connection unit 14 of the smart card 1 shown in FIG. 2, according to some embodiments of the present invention. Referring now to FIGS. 3 and 5, when used with the ISO 7816 interface, the D+ signal terminal and the D− signal terminal of the connection unit 14 are pulled down; that is, they are at a logic "low" level L. However, when used with the USB interface, the D+ signal terminal and the D− signal terminal of the connection unit 14 are pulled up; that is, they are at a logic "high" level H.

Thus, if a pull-down resistor (not shown) is connected to the D+ signal terminal or the D− signal terminal connected to the ISO 7816 interface 22, the D+ signal terminal or the D− signal terminal connected to the USB interface 23 is connected to a pull-up resistor (not shown) so as to input a logic high level signal to the D+ signal terminal or the D− signal terminal.

Referring to FIG. 5, both a signal input to an RST terminal, and a signal input to a CLK terminal are at a logic low level L during an activation period 51 to start a USB operation. A voltage applied to a VCC terminal changes to a voltage defined in the USB standard, and an I/O terminal reception mode is entered.

In FIG. 5, reference designator 52 denotes a time point representing that the current voltage is 4.01 V. When the voltage is applied to the VCC terminal, a USB attachment period 53 starts at a time point T1 (representing that the current voltage is greater than 4.01 V). At the time point T1, the reset signal input to the RST terminal and the clock signal input to the CLK terminal are changed to a logic "high" level H, and a signal input to or output from an I/O terminal may be at a logic "A" level or a logic "Z" level. When the USB attachment period 53 is equal to or greater than 100 ms and the D+ signal or the D− signal is at a logic high level, a USB data transmission mode 54 is entered. When the D+ signal is at a logic high level 55, data can be transmitted at a relatively high speed, and when the D− signal is at a logic high level 56, data can be transmitted at a speed lower than the speed at which data is transmitted when the D+ signal is at a logic high level.

Referring again to FIG. 4, when the USB interface 23 is connected to the connection unit 14, the first controller 20 may transmit a command or other data to the second controller 10 via the ISO 7816 interface 22 or the USB interface 23 if required (block 46). After transmitting desired data, the first controller 20 transmits an USB interface disable command to request an end of an USB interface (block 47). The second controller 10 analyzes and checks the USB interface disable command and responds to the first controller 20 (block 48). Thereafter, the first controller 20 communicates with the second controller 10 only via the ISO 7816 interface 22 (block 49).

According to some embodiments of the present invention, in order to securely collect a relatively large amount of data (such as personal information) from a smart card, the large amount of the data may be transmitted after performing user authentication to determine whether a user is an authorized user, thereby providing secure data transmission.

While the present invention has been particularly shown and described with reference to exemplary embodiments thereof, it will be understood by those skilled in the art that various changes in form and details may be made therein without departing from the spirit and scope of the invention as defined by the appended claims.

That which is claimed:

1. A method for controlling access to data stored on a smart card, the method comprising:

receiving, via a first communication interface of the smart card, an external request for communication with a second communication interface of the smart card, wherein the first communication interface comprises a different communication interface than the second communication interface; and transmitting, via the second communication interface of the smart card, private data from the smart card responsive to receiving the request via the first communication interface and responsive to authentication of a user thereof.

2. The method of claim 1, further comprising:
preventing transmission of the private data from the smart card responsive to failed authentication of the user.

3. The method of claim 1, further comprising:
receiving data from an external device via the first and/or second communication interface responsive to authentication of the user.

4. The method of claim 1, further comprising the following prior to transmitting the private data:
receiving user information from the user; and
comparing the received user information with authentication information stored in the smart card to authenticate the user.

5. The method of claim 1, wherein the second communication interface comprises a higher-speed interface than the first communication interface.

6. The method of claim 1, wherein the first communication interface comprises an International Standards Organization (ISO) interface, and wherein the second communication interface comprises a Universal Serial Bus (USB) interface.

7. The method of claim 6, wherein receiving the external request for communication with the smart card comprises receiving a USB interface enable command via the ISO interface of the smart card.

8. The method of claim 7, further comprising:
receiving a USB interface disable command responsive to transmitting the private data from the smart card via the USB interface.

9. A smart card data storage device, comprising:
a storage unit configured to store private data;
a connection unit configured to provide first and second communication interfaces wherein the first communication interface comprises a different communication interface than the second communication interface; and
a controller configured to receive an external request for communication with the smart card via the first communication interface, and configured to transmit private data from the smart card via the second communication interface responsive to reception of the request via the first communication interface and responsive to authentication of a user thereof, wherein the external request comprises a request for communication with the second communication interface.

10. The device of claim 9, wherein the controller is further configured to prevent transmission of the private data from the smart card responsive to failed authentication of the user.

11. The device of claim 9, wherein the controller is configured to receive data from an external device via the first and/or second communication interface responsive to authentication of the user.

12. The device of claim 9, wherein the controller is configured to receive user information from the user and is configured to compare the received user information with authentication information stored in the storage unit to authenticate the user.

13. The device of claim 9, wherein the first communication interface comprises an International Standards Organization (ISO) interface, wherein the second communication interface comprises a Universal Serial Bus (USB), and wherein the external request comprises a USB interface enable command.

14. The device of claim 13, wherein the controller is further configured to receive a USB interface disable command responsive to transmission of the private data from the smart card via the USB interface.

15. A communication device, comprising:
a controller;
a first communication interface coupled to the controller; and
a second communication interface coupled to the controller, wherein the first communication interface comprises a different communication interface than the second communication interface,
wherein the controller is configured to transmit a request for data to a smart card via the first communication interface, wherein the request comprises a request to receive the data from the second communication interface, and wherein the controller is configured to receive private data from the smart card via the second communication interface responsive to transmission of the request via the first communication interface and responsive to authentication of a user thereof.

16. The device of claim 15, further comprising:
a user interface coupled to the controller and configured to receive user information from the user,
wherein the controller is configured to authenticate the user based on the received user information.

17. The device of claim 16, wherein the controller is configured to receive authentication information from the smart card via the first communication interface, and wherein the controller is configured to compare the received user information with the authentication information to authenticate the user.

18. The device of claim 15, wherein the controller is configured to transmit data to the smart card via the first and/or second communication interface responsive to authentication of the user.

19. The device of claim 15, wherein the first communication interface comprises an International Standards Organization (ISO) interface, wherein the second communication interface comprises a Universal Serial Bus (USB), and wherein the request for data comprises a USB interface enable command.

20. The device of claim 19, wherein the controller is further configured to transmit a USB interface disable command responsive to receipt of the private data from the smart card via the USB interface.

* * * * *